United States Patent
Chen et al.

(10) Patent No.: US 12,001,616 B1
(45) Date of Patent: Jun. 4, 2024

(54) MOUSE DEVICE

(71) Applicant: SUNREX TECHNOLOGY CORP., Taichung (TW)

(72) Inventors: Chun-Chieh Chen, Taichung (TW); Che-Hsun Chang, Taichung (TW); Chi-Shu Hsu, Taichung (TW); Chang-Cheng Lee, New Taipei (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 18/448,355

(22) Filed: Aug. 11, 2023

(30) Foreign Application Priority Data

May 26, 2023 (TW) ................................ 112205331

(51) Int. Cl.
*G06F 3/0354* (2013.01)
*G06F 3/038* (2013.01)
*G06F 3/0487* (2013.01)

(52) U.S. Cl.
CPC .......... *G06F 3/03543* (2013.01); *G06F 3/038* (2013.01); *G06F 3/0487* (2013.01)

(58) Field of Classification Search
CPC ...... G06F 3/0312; G06F 3/033; G06F 3/0354; G06F 3/03541; G06F 3/03543; G06F 3/0487
See application file for complete search history.

(56) References Cited

U.S. PATENT DOCUMENTS

| | | | |
|---|---|---|---|
| 6,717,569 B1 * | 4/2004 | Gruhl | G06F 3/03543 345/157 |
| 6,762,751 B2 * | 7/2004 | Kuan | G06F 3/03543 345/157 |
| 8,704,770 B2 * | 4/2014 | Hotelling | G06F 21/31 345/173 |
| 2005/0259077 A1 * | 11/2005 | Adams | G06F 3/0362 345/163 |
| 2013/0038534 A1 * | 2/2013 | Krah | G06F 3/03543 345/163 |
| 2016/0224133 A1 * | 8/2016 | Perret-Gentil | G06F 3/017 |
| 2022/0050534 A1 * | 2/2022 | Van Hooft | G06F 3/03543 |

FOREIGN PATENT DOCUMENTS

| | | | | |
|---|---|---|---|---|
| CN | M325555 U | * | 1/2008 | ......... G06F 3/03543 |
| CN | 106598286 A | * | 4/2017 | ......... A47G 19/2227 |

* cited by examiner

*Primary Examiner* — Darlene M Ritchie
(74) *Attorney, Agent, or Firm* — Birch, Stewart, Kolasch & Birch, LLP

(57) ABSTRACT

A mouse device includes a lateral pressure sensing unit and a base unit having a base seat, a housing, and an inner space cooperatively defined by the base seat and the housing. The base seat is elongated in a front-rear direction, and includes a bottom face portion and an extension face portion surrounding and extending upwardly from the bottom face portion, and having spaced apart first and second lateral sections. The housing surrounds the base seat, extends upwardly from the extension face portion, and includes an operating portion extending upwardly from the first lateral section and having front, rear, upper, and lower pressing regions. The lateral pressure sensing unit is located in the inner space, is adjacent to the front, rear, upper and lower pressing regions, and is triggered upon operation on the operating portion.

10 Claims, 7 Drawing Sheets

MOUSE DEVICE

CROSS-REFERENCE TO RELATED APPLICATION

This application claims priority to Taiwanese Utility Model Patent Application No. 112205331, filed on May 26, 2023.

FIELD

The disclosure relates to a mouse device, and more particularly to a mouse device including a lateral pressure sensing unit.

BACKGROUND

A conventional computer mouse includes a lower casing, an interface circuit that is disposed in the lower casing, a control circuit that is disposed in the lower casing and that is electrically connected to the interface circuit, a right mouse button that is disposed above the lower casing and that is electrically connected to the control circuit, a left mouse button that is disposed above the lower casing and that is electrically connected to the control circuit, and a scroll-wheel that is located between the left mouse button and the right mouse button, and that is electrically connected to the control circuit.

The conventional computer mouse is electrically connected to a computer device and is operated by a user. The user may input commands via the left mouse button, the right mouse button, or the scroll-wheel. Then, the commands are transmitted to the computer device via the interface circuit as electric signals. However, during the operation of the conventional computer mouse, the user may only use the scroll-wheel to scroll vertically, and the conventional computer mouse does not provide the user with an option to scroll horizontally. Therefore, there is room for improvement in the conventional computer mouse.

SUMMARY

Therefore, an object of the disclosure is to provide a mouse device that can alleviate at least one of the drawbacks of the prior art.

According to an aspect of the disclosure, a mouse device adapted to be operated by a thumb, an index finger, and a middle finger of a user is provided. The mouse device includes a base unit, a main button unit, and a lateral pressure sensing unit. The base unit has a base seat, a housing, and an inner space. The base seat is elongated in a front-rear direction, and includes a bottom face portion and an extension face portion. The extension face portion surrounds the bottom face portion, extends upwardly from the bottom face portion in an up-down direction perpendicular to the front-rear direction, and has a first lateral section and a second lateral section spaced apart from each other in a left-right direction perpendicular to the front-rear direction and the up-down direction. The housing surrounds the base seat, extends upwardly from the extension face portion of the base seat in the up-down direction, and includes an operating portion and a palm supporting portion. The operating portion is adapted for operation by the thumb, extends upwardly from the first lateral section, and has a main region, a front pressing region, a rear pressing region disposed behind the front pressing region, an upper pressing region disposed above the front pressing region and the rear pressing region, and a lower pressing region disposed below the front pressing region, the rear pressing region, and the upper pressing region. The front pressing region, the rear pressing region, the upper pressing region, and the lower pressing region are disposed on the main region. The palm supporting portion cooperates with the operating portion to surround the base. The inner space is cooperatively defined by the base seat and the housing. The main button unit includes a first mouse button and a second mouse button disposed on the base unit and being respectively adapted for operation by the index finger and the middle finger. The lateral pressure sensing unit is located in the inner space, is adjacent to the front pressing region, the rear pressing region, the upper pressing region and the lower pressing region, and is configured to be triggered upon operation by the thumb on the operating portion.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
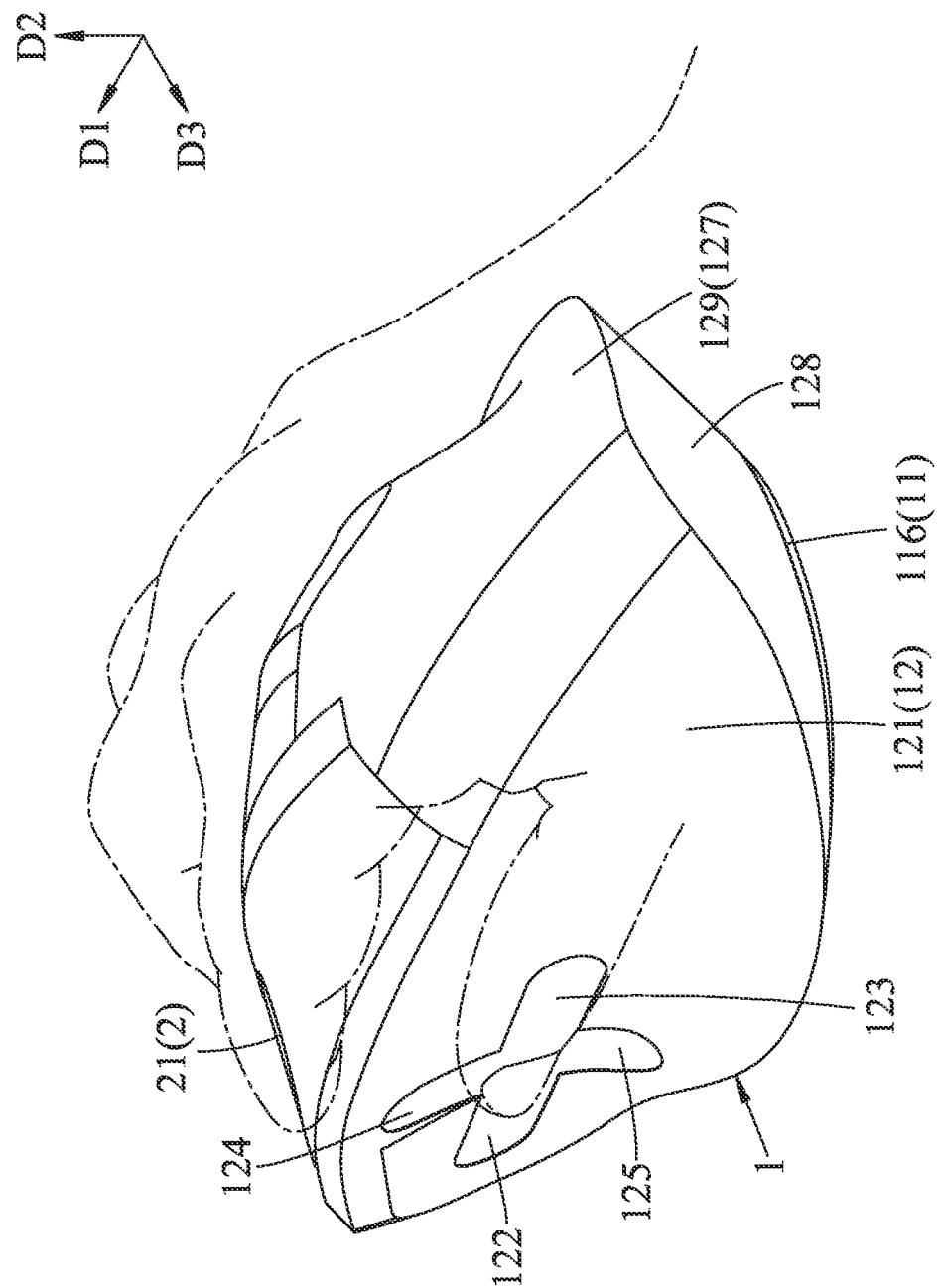
FIG. 1 is a schematic perspective view of a mouse device of an embodiment according to the present disclosure being operated by a user.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
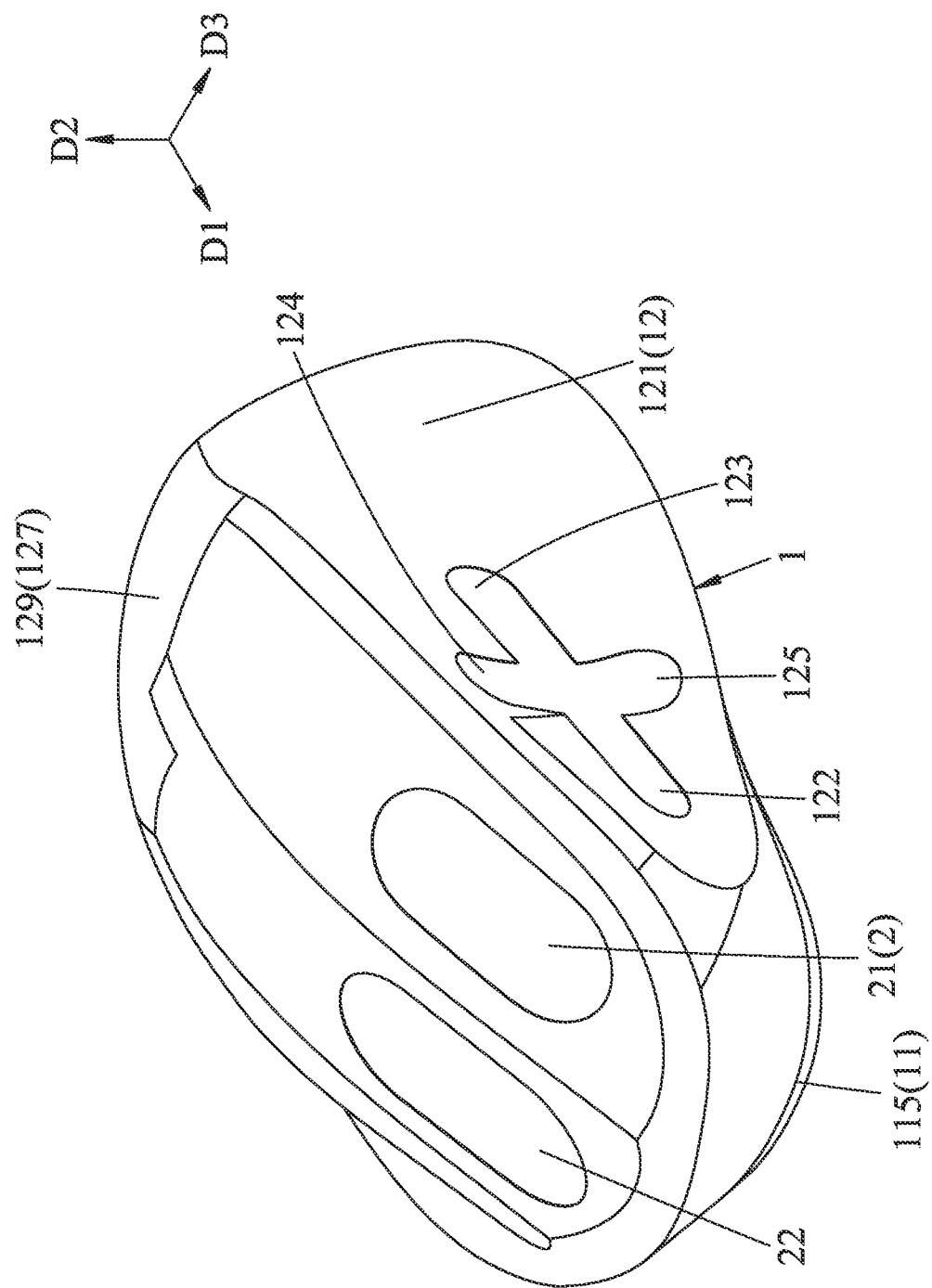
FIG. 2 is another perspective view of the embodiment from another view of angle different from FIG. 1.
Figure 3:
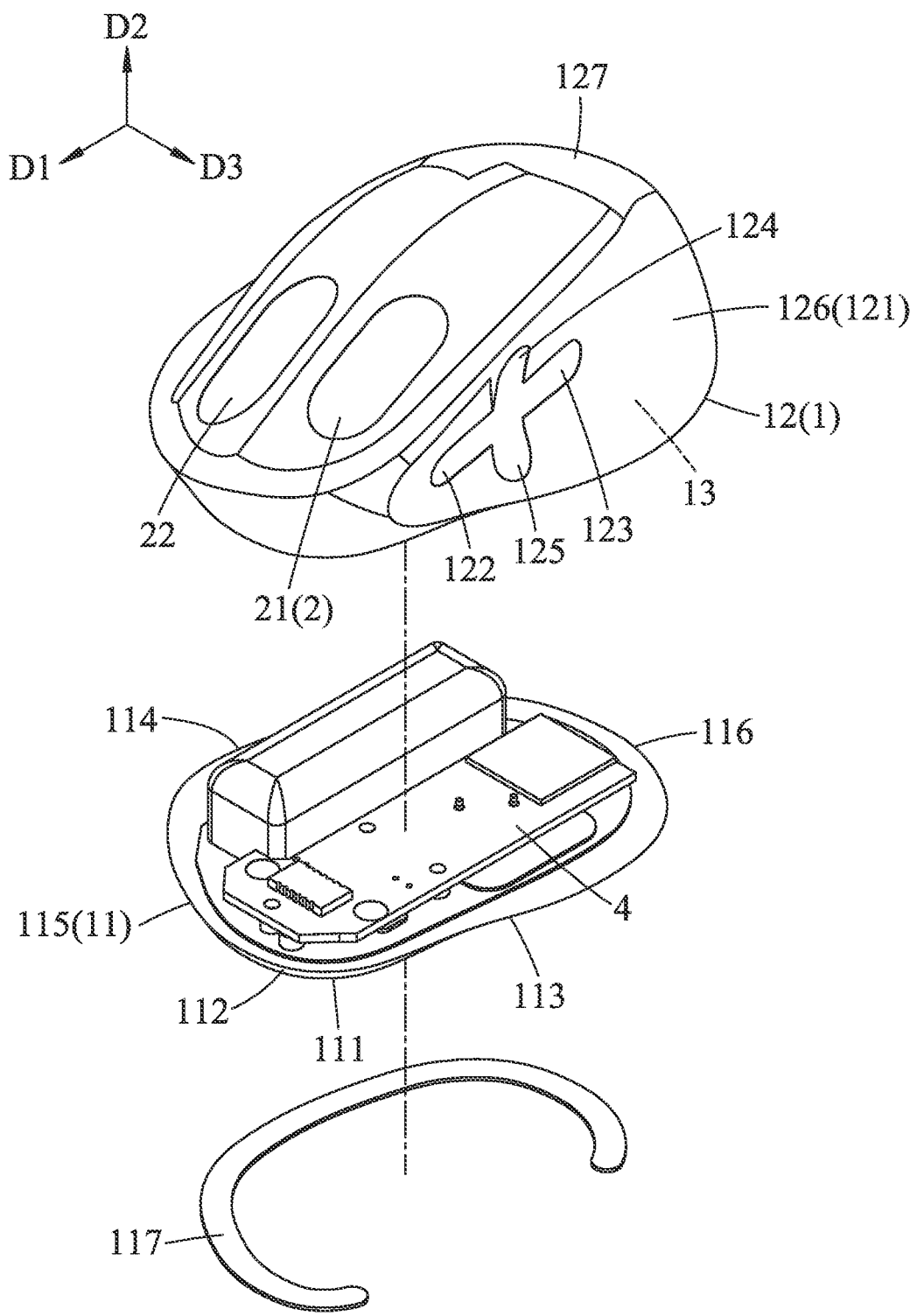
FIG. 3 is a partly exploded perspective view of the embodiment.

Referring to FIGS. 1 to 3, a mouse device of an embodiment according to the present disclosure is adapted to be electrically connected to a computer device (not shown) and operated by a user. The user may input commands with the mouse device which are then transmitted as electric signals to the computing device. The embodiment is adapted to be operated by a thumb, an index finger, and a middle finger of the user (see FIG. 1). It should be noted that the computing device may be a desktop computer, a laptop computer, a tablet computer or other similar devices, and the present disclosure is not limited in this respect.

The mouse device includes a base unit 1, a main button unit 2, a lateral pressure sensing unit 3 (see FIG. 4), and a main control unit 4 (see FIG. 3).

The base unit 1 is configured to be placed on a work surface (not shown), and has a base seat 11 being elongated in a front-rear direction (D1), a housing 12 surrounding the base seat 11 and extending upwardly from the base seat 11, and an inner space 13 cooperatively defined by the base seat 11 and the housing 12.

Figure 6:
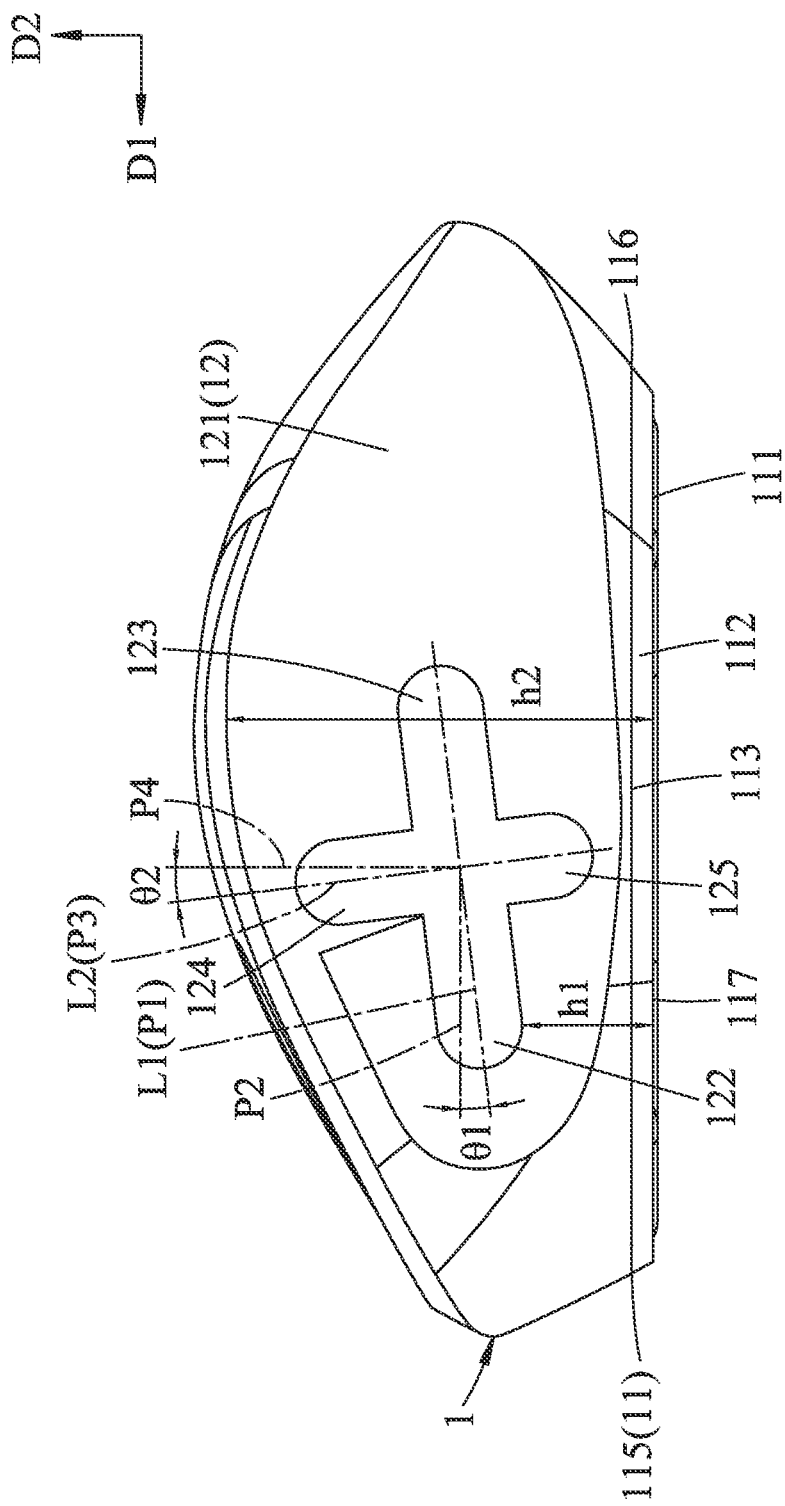
FIG. 6 is a left side view of the embodiment.

Referring to FIGS. 3 and 6, the base seat 11 has a bottom face portion 111, an extension face portion 112 that surrounds the bottom face portion 111 and that extends upwardly from the bottom face portion 111 in an up-down direction (D2) perpendicular to the front-rear direction (D1), and a non-slip strip 117 connected to the bottom face portion 111. The housing 12 extends upwardly from the extension face portion 112 of the base seat 11. The extension face portion 112 has a first lateral section 113 and a second lateral section 114 that are spaced apart from each other in a left-right direction (D3) perpendicular to the front-rear direction (D1) and the up-down direction (D2), and a front section 115 and a rear section 116 that are connected between the first lateral section 113 and the second lateral section 114 and that are spaced apart from each other in the front-rear direction (D1). The rear section 116 is disposed behind the front section 115.

Figure 4:
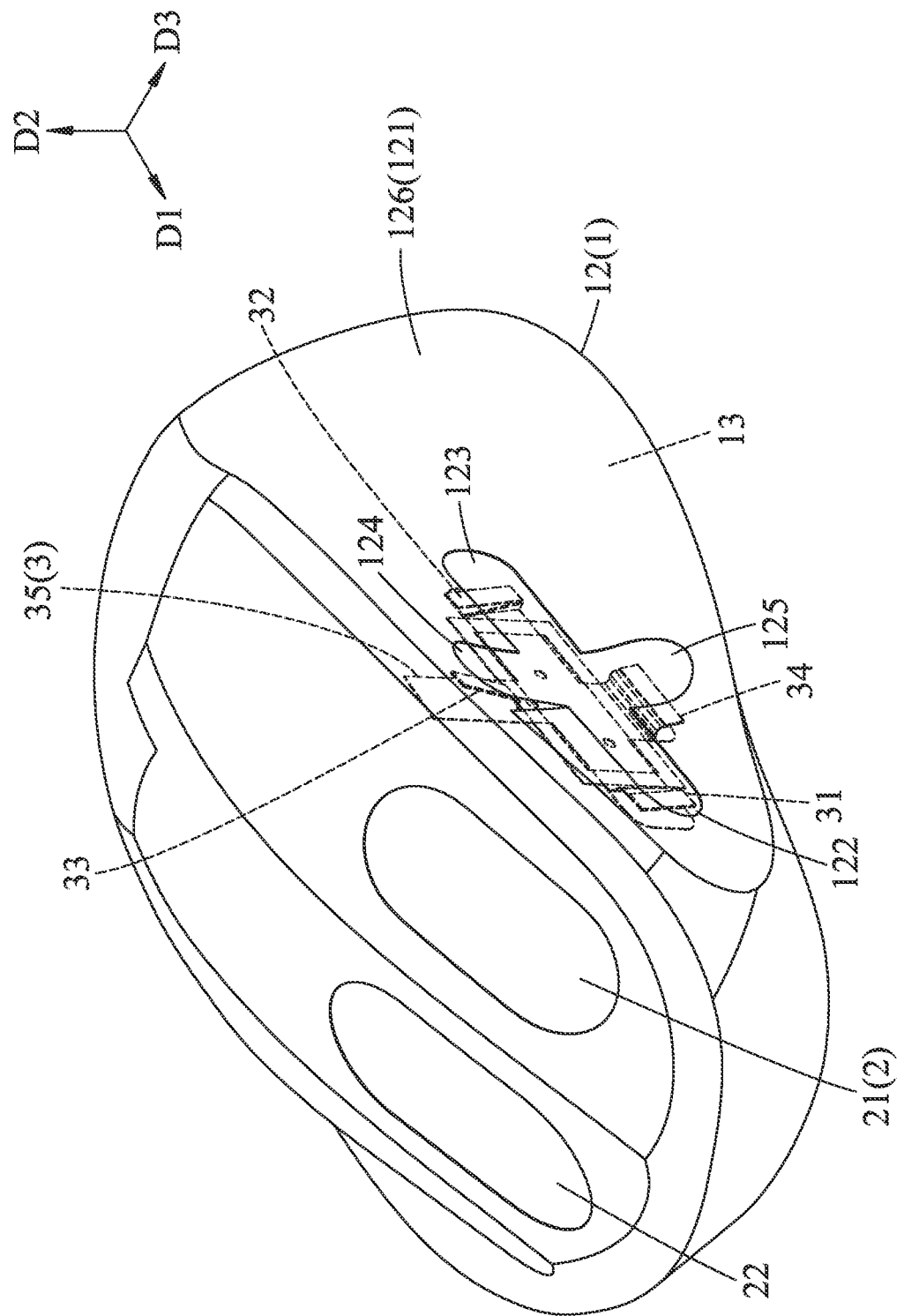
FIG. 4 is a schematic perspective view of the embodiment, illustrating a lateral pressure sensing unit being disposed adjacent to an operating portion of the mouse device.
Figure 5:
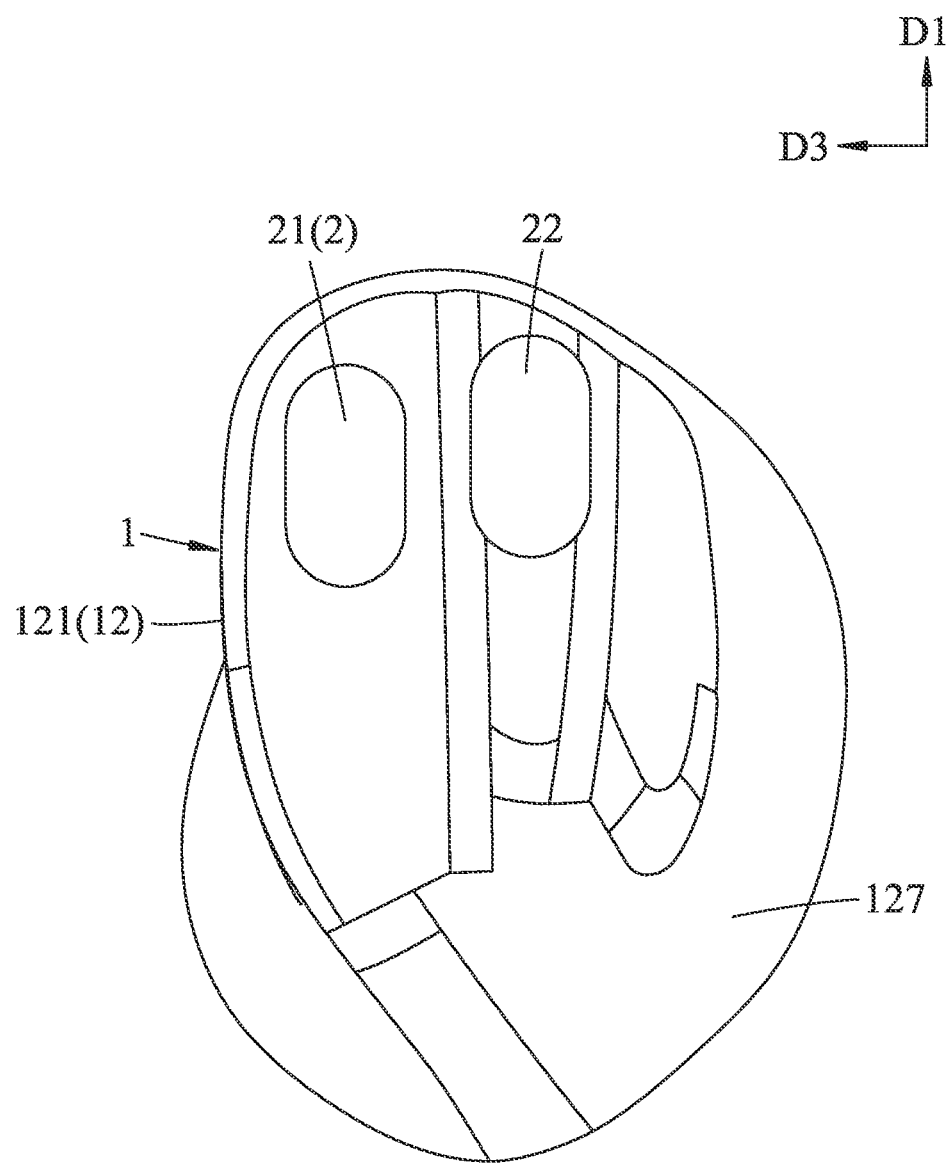
FIG. 5 is a top view of the embodiment.

Referring to FIGS. 3 to 5, the housing 12 has an operating portion 121 extending upwardly from the first lateral section 113, and a palm supporting portion 127 cooperating with the operating portion 121 to surround the base seat 11.

Figure 7:
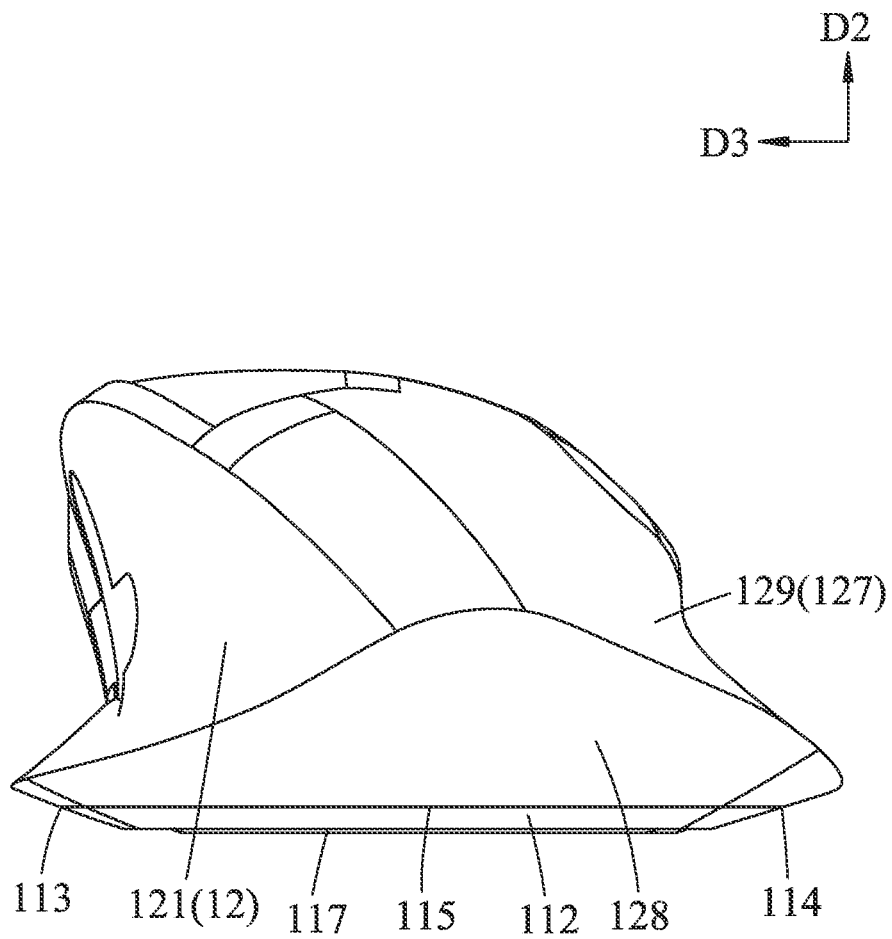
FIG. 7 is a rear side view of the embodiment.

As shown in FIG. 7, in this embodiment, the operating portion 121 is a curved surface that curves inwardly toward the palm supporting portion 127.

The operating portion 121 includes a main region 126, a front pressing region 122, a rear pressing region 123 disposed behind the front pressing region 122, an upper pressing region 124 disposed above the front pressing region 122 and the rear pressing region 123, and a lower pressing region 125 disposed below the front pressing region 122, the rear pressing region 123, and the upper pressing region 124. The front pressing region 122, the rear pressing region 123, the upper pressing region 124, and the lower pressing region 125 are generally arranged in a cross-shape, are disposed on an outer surface of the main region 126, and are adapted for operation by the thumb of the user.

In this embodiment, the front pressing region 122, the rear pressing region 123, the upper pressing region 124, and the lower pressing region 125 are made of an acrylonitrile-butadiene-styrene (ABS) copolymer resin coated with a thermoplastic polyurethane (TPU) so that the front pressing region 122, the rear pressing region 123, the upper pressing region 124, and the lower pressing region 125 are deformable and thus press against the lateral pressure sensing unit 3 upon operation by the thumb of the user.

Referring to FIGS. 6 and 7, in this embodiment, a lowest end of the front pressing region 122 is spaced apart from the bottom face portion 111 by a first height (h1) in the up-down direction (D2). A top end of an upper edge of the operating portion 121 is spaced apart from the bottom face portion 111 by a second height (h2) in the up-down direction (D2). The second height (h2) is substantially three times the first height (h1).

In this embodiment, the front pressing region 122 and the rear pressing region 123 define a first axis (L1) extending therethrough. A first angle ($\theta1$) between a first imaginary plate (P1) that overlaps the first axis (L1) and that extends in the left-right direction (D3) and a horizontal reference plane (P2) that is normal to the up-down direction (D2) ranges from 10° to 30°. The upper pressing region 124 and the lower pressing region 125 define a second axis (L2) extending therethrough. A second angle ($\theta2$) between a second imaginary plate (P3) that overlaps the second axis (L2) and that extends in the left-right direction (D3) and a vertical reference plane (P4) that is normal to the front-rear direction (D1) ranges from 10° to 30°.

As shown in FIGS. 1 and 7, the palm supporting portion 127 has a rear face section 128 connected to the base seat 11 and extending inclinedly and upwardly in the front-rear direction (D1) and the up-down direction (D2), and a lateral extension section 129 interconnecting a top end of the rear face section 128 and the operating portion 121.

The main button unit 2 includes a first mouse button 21 and a second mouse button 22 disposed on the base unit 1, which are respectively adapted for operation by the index finger and the middle finger of the user, and which are configured to respectively generate a first mouse button signal and a second mouse button signal upon operation by the user.

In this embodiment, the first lateral section 113 is located at a left side of the first mouse button 21 in the left-right direction (D3) and is adapted to be used by a right-handed person. However, in a variation of this embodiment, the first lateral section 113 is located at a right side of the second mouse button 22 in the left-right direction (D3) and is adapted to be used by a left-handed person.

As shown in FIG. 4, the lateral pressure sensing unit 3 is located in the inner space 13 and is adjacent to the front pressing region 122, the rear pressing region 123, the upper pressing region 124 and the lower pressing region 125, and is configured to be triggered upon operation by the thumb of the user on the operating portion 121.

The lateral pressure sensing unit 3 includes a front pressure sensor 31 corresponding in position to the front pressing region 122, a rear pressure sensor 32 corresponding in position to the rear pressing region 123, an upper pressure sensor 33 corresponding in position to the upper pressing region 124, a lower pressure sensor 34 corresponding in position to the lower pressing region 125, and a lateral circuit board 35 electrically connected to the front pressure sensor 31, the rear pressure sensor 32, the upper pressure sensor 33, and the lower pressure sensor 34.

The front pressure sensor 31, the rear pressure sensor 32, the upper pressure sensor 33, and the lower pressure sensor 34 are adapted to be respectively triggered upon operation by the thumb of the user in the front pressing region 122, the rear pressing region 123, the upper pressing region 124, and the lower pressing region 125, and the lateral circuit board 35 is configured to generate a control signal indicating which one of the front pressure sensor 31, the rear pressure sensor 32, the upper pressure sensor 33, and the lower pressure sensor 34 is triggered. In this embodiment, the lateral circuit board 35 is a flexible printed circuit board, and the front pressure sensor 31, the rear pressure sensor 32, the upper pressure sensor 33, and the lower pressure sensor 34 are micro switches and the present disclosure is not limited herein.

The main control unit 4 is disposed in the inner space 13, and is electrically connected to the main button unit 2 and the lateral pressure sensing unit 3. The main control unit 4 is configured to receive the first mouse button signal, the second mouse button signal, and the control signal generated by the lateral circuit board 35 and transmit commands to the computing device to perform clicks, webpage scrolling, and menu selections. It should be noted that the mouse device may include a displacement sensor unit (not shown) that is disposed in the housing 12, and that includes a light source and a photocell. The light source emits light from bottom of the mouse device to shine on the work surface, and the light is reflected by the work surface and is detected by the photocell. The photocell measures changes in the reflected light source and generates a displacement signal. The main control unit 4 is electrically connected to the displacement sensor unit to receive the displacement signal. It should be noted that the lateral pressure sensing unit 3 and the displacement sensor unit are technical features that are well known in the field of computer mouse technology, and are not the main features of the present disclosure. Therefore, further details elaborating the function of the same are omitted for the sake of brevity. It should be noted that the main control unit 4 may include a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The advantages of the mouse device of the embodiment of the present disclosure are described below.

By virtue of the arrangement of the front pressing region 122, the rear pressing region 123, the upper pressing region 124, and the lower pressing region 125 that are located respectively at a front, a rear, an upper and a lower sections of the operating portion 121, and that are disposed respectively corresponding in position to the front pressure sensor 31, the rear pressure sensor 32, the upper pressure sensor 33, and the lower pressure sensor 34, the lateral circuit board 35 is able to generate the control signal indicating which one of the front pressure sensor 31, the rear pressure sensor 32, the upper pressure sensor 33, and the lower pressure sensor 34 is triggered upon operation to the respective one of the front pressing region 122, the rear pressing region 123, the upper pressing region 124, and the lower pressing region 125. The front pressing region 122, the rear pressing region 123, the upper pressing region 124, and the lower pressing region 125 may be intuitively operated by the thumb of the user and thus provide a relatively good user experience and is convenient in use.

Furthermore, by virtue of structures of the operating portion 121 being a curved surface, the second height (h2) being substantially three times the first height (h1), and the rear uplift section 128 extending gradually and upwardly, the thumb may press against the front pressing region 122, the rear pressing region 123, the upper pressing region 124, and the lower pressing region 125 in an ergonomic manner with enhanced comfort.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A mouse device adapted to be operated by a thumb, an index finger, and a middle finger of a user, said mouse device comprising:
  a base unit that has
    a base seat being elongated in a front-rear direction, and including
      a bottom face portion,
      an extension face portion that surrounds said bottom face portion, that extends upwardly from said bottom face portion in an up-down direction perpendicular to the front-rear direction, and that has a first lateral section and a second lateral section spaced apart from each other in a left-right direction perpendicular to the front-rear direction and the up-down direction, and
    a housing surrounding said base seat, extending upwardly from said extension face portion of said base seat in the up-down direction, and including
      an operating portion that is adapted for operation by the thumb, that extends upwardly from said first lateral section, and that has
        a main region,
        a front pressing region,
        a rear pressing region disposed behind said front pressing region,
        an upper pressing region disposed above said front pressing region and said rear pressing region, and
        a lower pressing region disposed below said front pressing region, said rear pressing region, and said upper pressing region, said front pressing region, said rear pressing region, said upper pressing region, and said lower pressing region being disposed on said main region, and
      a palm supporting portion that cooperates with said operating portion to surround said base, and
    an inner space cooperatively defined by said base seat and said housing;
  a main button unit that includes a first mouse button and a second mouse button disposed on said base unit, and being respectively adapted for operation by the index finger and the middle finger; and
  a lateral pressure sensing unit that is located in said inner space, that is adjacent to said front pressing region, said rear pressing region, said upper pressing region and said lower pressing region, and that is configured to be triggered upon operation by the thumb on said operating portion.

2. The mouse device as claimed in claim 1, wherein said lateral pressure sensing unit includes:
  a front pressure sensor corresponding in position to said front pressing region;
  a rear pressure sensor corresponding in position to said rear pressing region;

an upper pressure sensor corresponding in position to said upper pressing region;

a lower pressure sensor corresponding in position to said lower pressing region; and a lateral circuit board electrically connected to said front pressure detecting sensor, said rear pressure detecting sensor, said upper pressure detecting sensor, and said lower pressure detecting sensor.

3. The mouse device as claimed in claim 2, wherein said lateral circuit board is a flexible printed circuit board.

4. The mouse device as claimed in claim 1, wherein:

said front pressing region and said rear pressing region define a first axis extending therethrough;

a first angle between a first imaginary plate that overlaps the first axis and that extends in the left-right direction and a horizontal reference plane that is normal to the up-down direction ranges from 10° to 30°;

said upper pressing region and said lower pressing region define a second axis extending therethrough; and a second angle between a second imaginary plate that overlaps the second axis and that extends in the left-right direction and a vertical reference plane that is normal to the front-rear direction ranges from 10° to 30°.

5. The mouse device as claimed in claim 1, wherein:

a lowest end of said front pressing region is spaced apart from said bottom face portion by a first height in the up-down direction;

a top end of said operating portion is spaced apart from said bottom face portion by a second height in the up-down direction; and said second height is substantially three times said first height.

6. The mouse device as claimed in claim 1, wherein said base seat further includes a non-slip strip connected to said bottom face portion.

7. The mouse device as claimed in claim 1, wherein said operating portion is a curved surface that curves inwardly.

8. The mouse device as claimed in claim 1, wherein said front pressing region, said rear pressing region, said upper pressing region, and said lower pressing region are made of an acrylonitrile-butadiene-styrene (ABS) copolymer resin coated with a thermoplastic polyurethane (TPU).

9. The mouse device as claimed in claim 1, wherein:

said front pressing region and said lower pressing region define a first axis extending therethrough; and a first angle between a first imaginary plate that overlaps the first axis and that extends in the left-right direction and a horizontal reference plane that is normal to the up-down direction ranges from 10° to 30°.

10. The mouse device as claimed in claim 1, wherein:

said upper pressing region and said lower pressing region define a second axis extending therethrough; and a second angle between a second imaginary plate that overlaps the second axis and that extends in the left-right direction and a vertical reference plane that is normal to the front-rear direction ranges from 10° to 30°.

* * * * *